Feb. 1, 1938.   R. A. TERRELL   2,107,093
ELECTRIC WELDING APPARATUS
Filed April 13, 1936    2 Sheets-Sheet 2
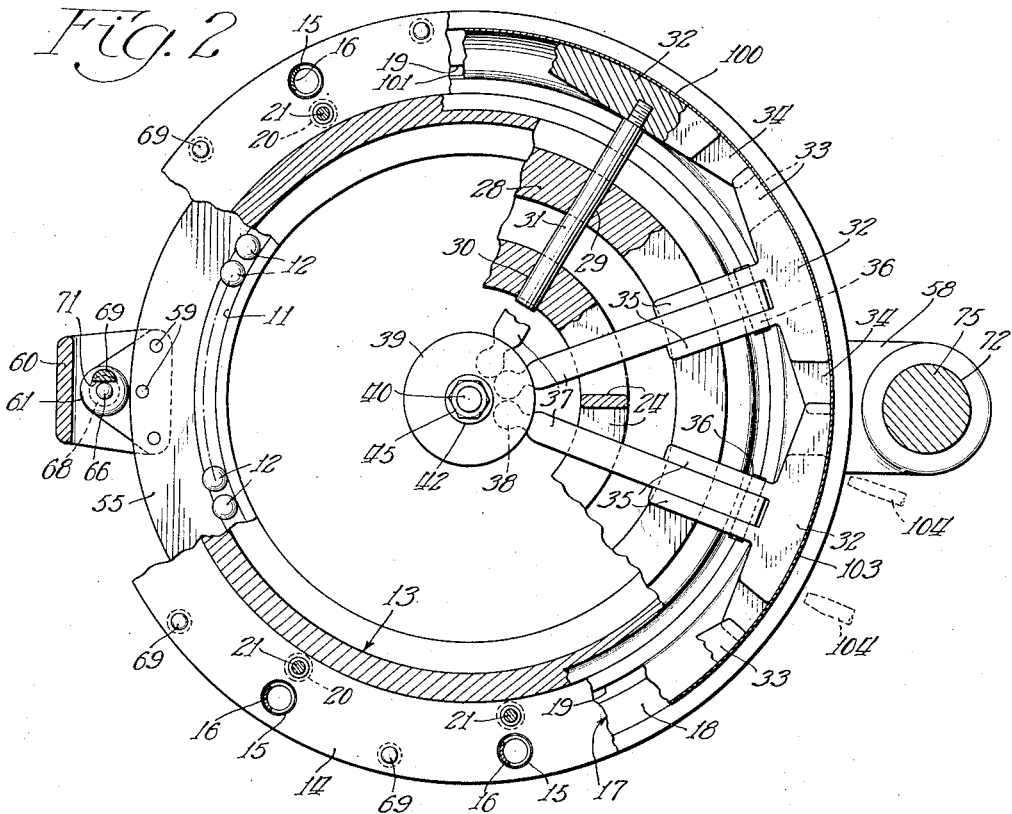
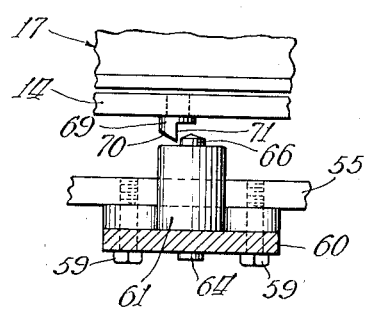
Inventor:
Ralph A. Terrell.
By Edward C. Gitzbough
Atty.

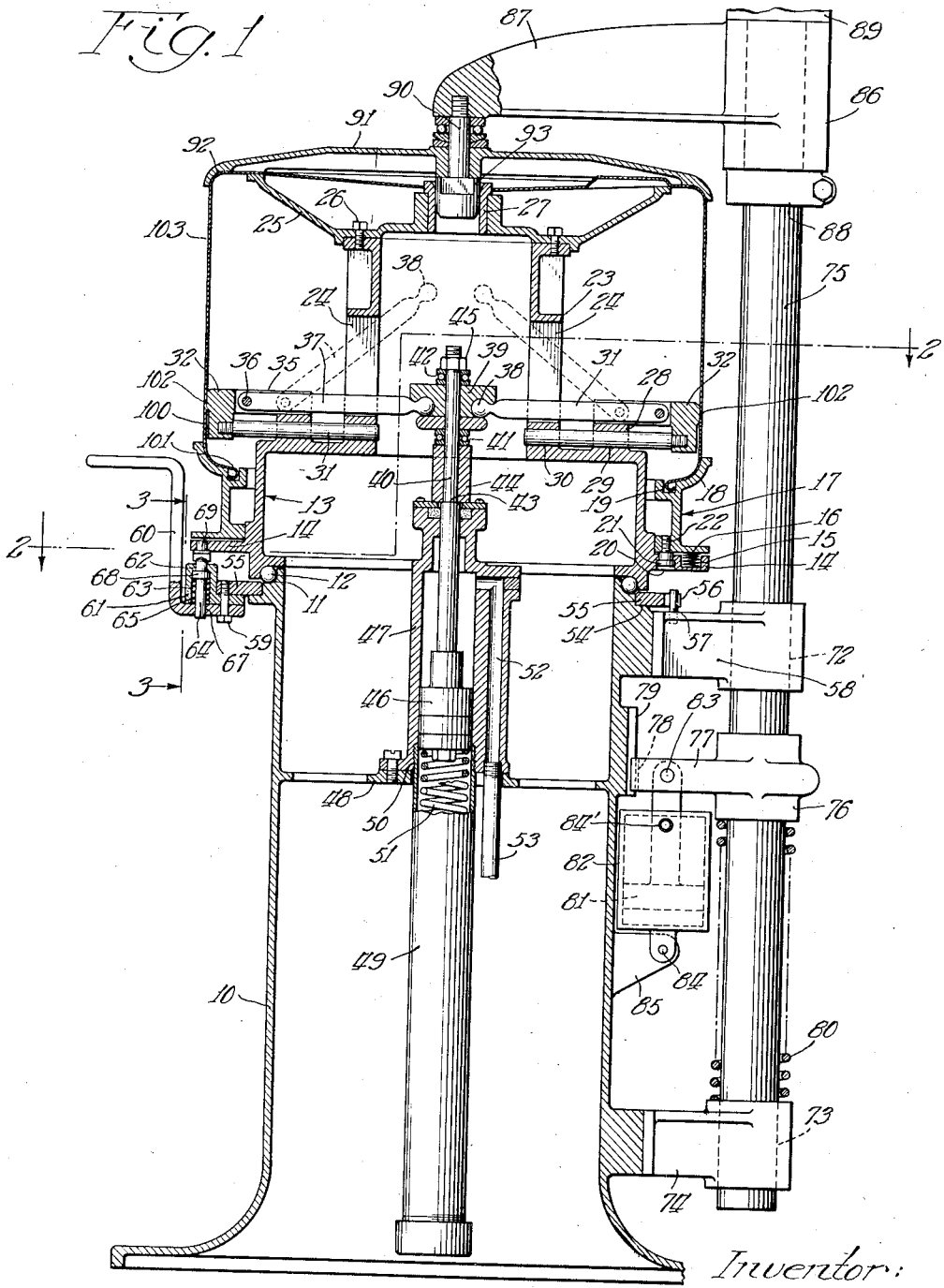

Patented Feb. 1, 1938

2,107,093

UNITED STATES PATENT OFFICE 2,107,093

ELECTRIC WELDING APPARATUS

Ralph A. Terrell, Chicago, Ill., assignor to Borg-Warner Corporation, Chicago, Ill., a corporation of Illinois Application April 13, 1936, Serial No. 74,077

4 Claims. (Cl. 219—4)

This invention relates to a welding machine employing novel work holding parts and an improved welding electrode for operating in conjunction therewith.

The principal object of the present invention is the provision of a machine for expediting a welding process for fabricating containers from sheet metal.

Sheet metal containers having a restricted or "bottle-neck" opening may be made of two preformed parts of which one is the main body and the other the neck portion of such container. Said parts are secured together by a leak-proof welded joint extending continuously about the finished container side wall. To ensure that the welded joint shall be the same in all instances and that all containers shall possess uniformity of size and shape, the container parts are preliminarily secured together in a standard fashion prior to effecting the final weld. The present apparatus provides means for arranging the parts in position for assembly and for fastening them selectively in place by a series of preliminary spot welds. Thereafter, the partly finished work is removed to other apparatus for further treatment.

A thorough understanding of the invention will be had upon reading the following description in conjunction with the accompanying two sheets of drawings, hereby made a part of this specification, and wherein:

Fig. 1 is a vertical sectional view taken centrally through a machine embodying the present invention;

Fig. 2 is a transverse sectional view taken on the line 2—2 of Fig. 1; and

Fig. 3 is a fragmentary view showing structural details of certain parts of the machine, and taken on the line 3—3 of Fig. 1.

The same reference characters are used for designating similar parts shown in the several views of the drawings and described hereinafter.

In Fig. 1 the machine will be seen to rest upon a base 10 which may be made of cast iron. About the upper outer section of the base 10 is formed a ball race 11 upon which are a series of ball bearings 12 in support of a turret designated generally by the reference character 13.

Extending radially from the base portion of turret 13 is a flange 14 having a series of recesses 15 spaced thereabout for the reception of cushion springs 16; see Figs. 1 and 2. The springs 16 support an annular workholder member 17 having a seat 18 and a groove 19 extending continuously thereabout for receiving a part of the work to be handled by the machine. Adjacent to each of the recesses 15 and disposed radially inwardly therefrom are apertures 20 which receive the heads of bolts 21, the latter being threaded into apertures 22 within the work holder member 17 for firmly holding the latter upon the cushion springs 16. A slight space is left between the workholder 17 and the flange 14, so that there may be relative vertical movement therebetween incident to compressing the springs 16 as permitted by the bolts 21 of which the heads are free to move vertically within the apertures 20. The upper part of the turret 13 consists of a cylindrical section 23 having a plurality of spaced-apart vertical openings 24. Upon the top of the cylindrical section 23 is a dished plate 25, bolts 26 being used for securing said parts together. The central section of the plate 25 contains a bushing 27.

A circular flange 28 extends upwardly from the base portion of the turret 13 and contains a series of radial bearings 29 in alignment with the slots 24. Axially of the bearings 29 are bearings 30 formed within the side wall of the cylindrical turret section 23. Bearings 29 and 30 carry reciprocal electrode stems 31 which carry electrode shoes 32 upon their outer ends. Reference to Fig. 2 will show that the electrode shoes 32 have bifurcations 33 upon one end and a tongue 34 upon the opposite end whereby the bifurcations of each of the electrode shoes are adapted to receive the tongue of a shoe adjacent thereto. The outer side of each shoe 32 is arcuate, so that when the stems 31 are in their outer radial position, the outer sides of said shoes will form a circular outline. The tongue and groove structure of said electrode shoes adapts them to be clustered together and permits of the electrode structure being collapsed incident to the stems 31 being retracted radially inwardly. In other words, the shoes are component parts of a large collapsible electrode. Each electrode shoe 32 has a pair of spaced apart ears 35 carrying a pin 36 to which is pivotally connected an operating rod 37. Each of the rods 37 has a ball 38 upon its inner end for pivotal connection with a bearing head 39 secured upon the upper end of a vertically reciprocal shaft 40. The bearing head 39 is disposed rotatively upon the shaft 40 and is held against axial movement upon such shaft by means of ball bearings 41 and 42. A shoulder 43 upon the shaft 40 has a collar 44 resting thereon to properly space the bearing 41 axially of the shaft, and a nut 45 screwed upon the upper end of the shaft serves to press the bearings 41 and 42 and the bearing head 39 snugly together.

Upon the lower end of the vertically reciprocal rod 40 is a piston 46 contained within a cylinder 47, which is supported upon a horizontal interior wall 48 of the base 10. A spring chamber 49 has a threaded connection at 50 with the lower end of the cylinder 47, said chamber 49 containing a relatively strong compression spring 51, which constantly urges the piston 46 toward its upper limit of reciprocation. The piston 46 is adapted to be moved downwardly against the urge of the spring 51 by compressed fluid such as air. Fluid is admissible to the cylinder 47 through a duct 52 to which such fluid is supplied through a conduit 53.

Means for rotating the turret 13 intermittently through equal distances will now be described. Rotatively disposed upon a shoulder 54 of the base 10 is a ring 55 having an elongated arcuate notch 56 within the outer periphery of its back or right side, Fig. 1. A pin 57 anchored within a bearing bracket 58 projects upwardly into the notch 56. The pin 57, by abutting against the two extremities of the notch 56, provides limits for oscillatory movement of the ring 55. Bolts 59 hold an operating handle 60 upon the front or left side, Fig. 1, of the ring 55. Said bolts 59 further secure a latch housing 61 upon the ring 55. The latch housing is apertured at 62 and has a hollow section 63 for receiving the bolt of a latch 64 and a spring 65, which constantly urges the latch 64 upwardly. The lower end of the latch 64 projects through an aperture 67 within the operating handle 60. Upward movement of the latch 64 under the influence of spring 65 is limited by the abutment of an enlarged section 68 of the latch. In Figs. 1 and 3, it may be seen that the upper end of the latch 64 is bevelled to facilitate its cooperation with a series of lugs 69 spaced equidistantly about and projecting downwardly from the flange 14 upon the base of the turret 13. The flange 14 carries the same number of lugs 69 as there are shoes 32 of the expansible and contractible electrode. Each lug 69 has an inclined face 70 and a vertical face 71 for coacting with the latch 66 in a manner hereinafter described.

The bracket 58 contains a bearing 72 which cooperates with a bearing 73 in a bracket 74 for reciprocally containing a rod 75. Brackets 58 and 74 may be secured in any conventional manner to a side wall of the base 10. A collar 76 is fastened rigidly to the rod 75, and has a forwardly extending part 77 containing a groove 78 which receives a rib 79 formed upon the back wall of the base 10. The rib 79 and groove 78 prevent rotative movement of the rod 75 while permitting vertical movement thereof. A spring 80 coiled about the lower part of the rod 75 constantly exerts a force between the bearing bracket 74 and collar 76 whereby the rod 75 is always urged upwardly. Downward movement of the rod 75 in opposition to the force of spring 80 is had by means of a piston 81 disposed within a cylinder 82, and having a connection with the collar 76 through the forwardly extending portion 77 thereof and a pin 83. The cylinder 82 is connected by means of a pin 84 to an ear 85 projecting from the back wall of the base 10. When a fluid under pressure is introduced into the upper part of the cylinder 82 through a conduit 84', the piston 81 and the rod 75 will be forced downwardly.

Pivotally disposed upon the upper end of rod 75 by means of its shank 86 is a plate holder arm 87. The shank 86 is held selectively spaced along the rod 75 by means of collars 88 and 89. The outer end of arm 87 has a spindle 90 anchored therein. Upon the spindle 90 is journalled a workholder plate 91 having an annular seat 92 about its lower peripheral edge. The spindle 90 carries a bearing member 93 tapered near its lower edge, so that the spindle 90 may be easily guided into telescopic relation with the journal 27.

The operation of the machine will now be described:

Manipulation of pistons 46 and 81 which are actuated from a source of pressure fluid is controlled by an auxiliary valve mechanism not shown. Such valve mechanism is first operated so as to release all pressure within the cylinders 47 and 82, whereupon spring 51 will force the inner ends of operating rods 37 upwardly to the position indicated in dotted outline, thereby collapsing the electrode comprising electrode shoes 32. Concurrently, the rod 75 will be moved upwardly upon the influence of the spring 80, whereby the work-holder plate 91 is elevated to a position above that in which it is illustrated in Fig. 1. Thereafter, the arm 87 is pivoted to carry the work-holder plate 91 out of registry with the work-holder ring 17. While the electrode is, as described above, collapsed, a piece of work consisting of a ring-like piece 100 of sheet metal is telescoped over the electrode, and disposed upon the seat 18. The groove 19 within the holder member 17 is adapted to receive the rolled edge 101 circumscribing the constricted opening within the piece 100. The piece 100 illustrated is the neck portion for a sheet metal container, and is shown inverted in the machine. Prior to its insertion into the machine, the ring-like piece 100 has its upwardly disposed edge diagonally kerfed as indicated at 102. With the piece 100 seated upon the machine as described, the fluid pressure control valve mechanism is adjusted to direct fluid into the cylinder 47, whereby to force the piston 46 downwardly and expand the electrode against the kerfed section of the work. This operation accurately centers the piece upon the machine and straightens any irregularities which may exist in the kerfed section. Next, the fluid pressure is "eased off" in the cylinder 47 to slightly contract the electrode shoes 32. The work piece 103 for forming the bottom of the container is next inverted over the plate 25 and its kerfed edge, also illustrated at 102, slipped about the outer edge of the electrode and into abutting relation with the kerfed section of the bottle neck portion of the work. The arm 87 is then pivoted to carry work-holder member 91 over the piece 103, and the fluid control valve manipulated to introduce fluid into the cylinder 82, thus forcing the workholder 91 downwardly for pressing the work sections 103 and 100 firmly together. It will be observed that during this operation the outer side of the collapsible electrode serves as a guide for directing the two pieces of work together at their diagonally abutting peripheral edges. The valve mechanism is next manipulated to increase the fluid pressure above cylinder 46, so that the electrode shoes 32 are brought to bear more firmly against the inner sides of the work parts 100 and 103. This having been done, the machine is in readiness for intermittent rotation of the turret between periods of spot welds being effected upon the work.

Movement of the operating handle 60 clockwise, as viewed from above, will bring the latch 64 against the vertical face 71 of a stud 69, whereby the ring 55 is rotated to one of its reciprocal limits determined by the pin 57. When at such limit, one of the electrode shoes 32 will be brought into registry with a pair of electrodes 104 shown in dotted outline in Fig. 2. The electrodes 104 are a part of a welding gun (not shown) disposed beside the present machine and adapted to co-operate therewith in the welding together of the pieces 100 and 103. The present machine including the electrode shoes 32 thereof is maintained at ground potential, whereas the electrodes 104 are maintained at a much higher potential so that when the latter are carried radially inwardly against the kerfed sections 101 of the work parts 100 and 103, an electric current will pass between each of the electrodes 104 and the electrode shoe 32 opposite thereto. Spot welds will thus be formed at those sections where current passes through the work. The welding gun containing the electrodes 104 may be placed at any position about the machine. Moreover, if desired, a plurality of such guns may be used on different sides of the machine. When more than one welding gun is used, the electrodes thereof will be actuated simultaneously for effecting spot welds.

Subsequent to the forming of spot welds by the flow of electric current between electrodes 104 and an electrode shoe 32, the electrodes 104 are retracted, and the operating handle 60 is shifted counter-clockwise until the ring 55 has been rotated to its opposite oscillatory limit determined by the pin 57 when abutted by the opposite side of the notch 56. During such movement of the ring 55 the latch 66 will have been carried under the inclined face 70 of the next succeeding stud 69 and stand in readiness to engage the face 71 thereof so that upon the next following clockwise shift of the operating handle, the turret 13 will be rotatively advanced to present the succeeding shoe 32 in registry with the electrodes 104. The electrodes 104 will again be carried against the work and additional spot welds formed along the kerfs 102. This process is repeated until a series of spot welds have been formed equi-distantly about the work for securing together the work pieces 100 and 104.

After the work has been completely spot-welded, the valve mechanism is manipulated to permit escape of the fluid from the cylinders 47 and 82, so that the work-holder plate 91 and the electrode shoes 32 are retracted. The arm 87 is then swung to one side and the partly completed work removed from the machine. Inasmuch as the electrode is collapsed, no difficulty will be encountered in slipping the restricted bottle neck opening over such electrode while removing the work from the machine.

I claim:

1. A welding machine comprising a work-holder turret, a complemental rotatable work-holder plate in opposed coaxial relation with said turret, and a welding electrode rotatable with said turret and said plate, said electrode including a plurality of shoes movable radially of said turret.

2. A welding machine comprising a work-holder turret, a welding electrode on said turret and including a plurality of shoes movable radially thereof, a work-holder plate rotatable coaxially with said turret and movable toward and away from said turret, and means operable to cause movement of said shoes and of said work-holder plate.

3. In a machine for welding together pieces of work, work-holder parts operable to press work pieces into assembly, and an expansible electrode providing mandrel means for guiding said parts into such assembly.

4. In a machine for welding together work pieces at flexible sections thereof which are adapted to interfit only when of a selected shape, work-holder parts for relatively moving said pieces into assembly with the flexible sections in interfitted relationship, and an electrode adjustable in size to provide mandrel means for guiding said flexible sections into such interfitted relationship while said pieces are being moved into assembly.

RALPH A. TERRELL.